Sept. 3, 1963     H. C. HANSEN     3,102,966
SHAFT STRUCTURE FOR ELECTRICAL MOTOR
Filed June 24, 1958     2 Sheets-Sheet 1

INVENTOR:
Hans Christian Hansen,
BY
*Edward P. Marmorek*
His Attorney.

Sept. 3, 1963  H. C. HANSEN  3,102,966
SHAFT STRUCTURE FOR ELECTRICAL MOTOR
Filed June 24, 1958  2 Sheets-Sheet 2
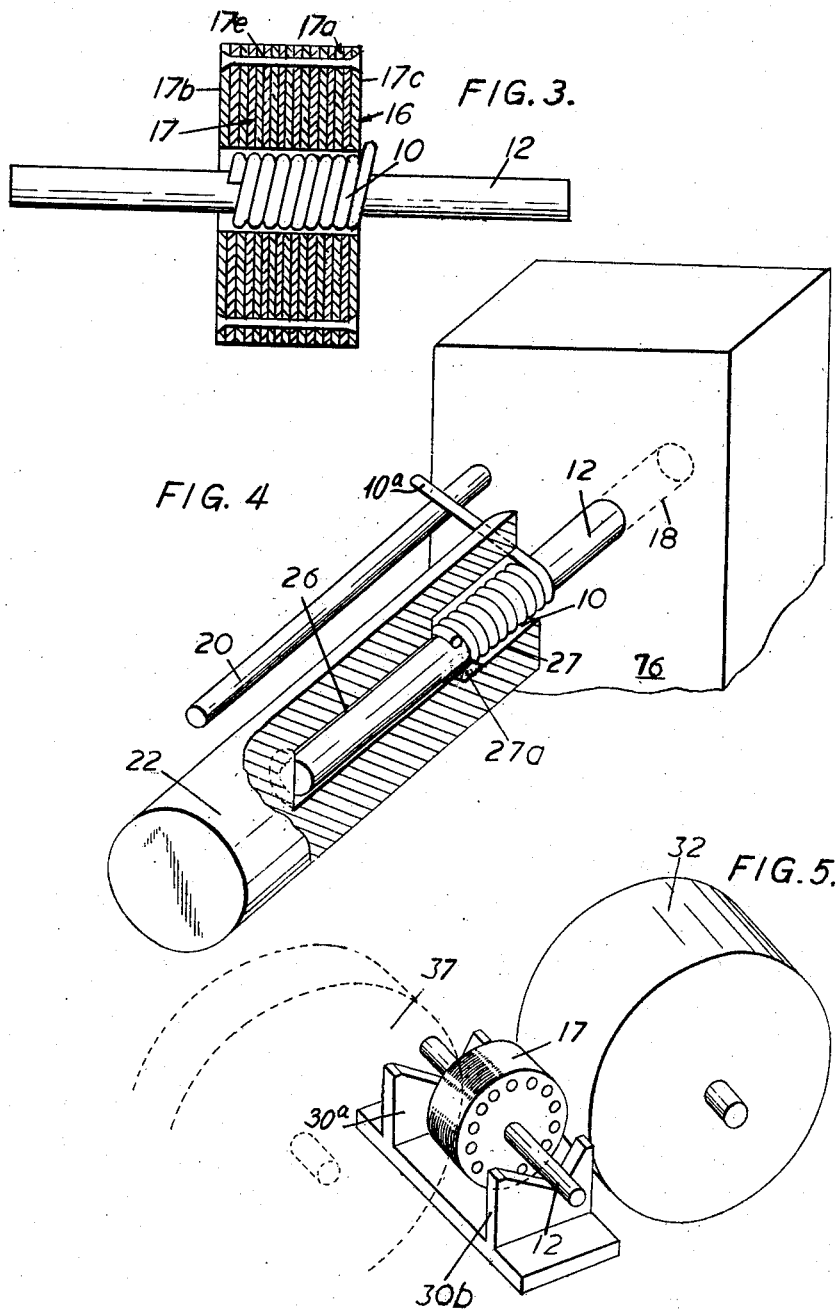
INVENTOR.
Hans Christian Hansen,
BY
Earnest F. Marmorek,
His Attorney.

3,102,966
SHAFT STRUCTURE FOR ELECTRICAL MOTOR
Hans C. Hansen, 14 Christiansholmsvej, Klampenborg,
Copenhagen, Denmark
Filed June 24, 1958, Ser. No. 744,232
Claims priority, application Great Britain July 1, 1957
5 Claims. (Cl. 310—261)

This invention relates to electrical motors and especially small electrical motors such as for use in driving a phonograph turntable and similar equipment.

It will be appreciated, however, that my invention may also with advantage be applied to other types of motors.

It is one object of the invention to provide an electrical motor which enables an easy fastening of the rotor spindle in the rotor lamination package.

Still a further object of the invention is to provide an electrical motor having a rotor structure which enables use of a thin spindle so as to thereby reduce mechanical noise in the rotor bearings.

Still a further object of the invention is to provide a motor structure in which the rotor spindle has a polished surface and can be secured in the rotor lamination package without the danger of damaging the polished surface.

Still another object of the invention is to provide a motor structure in which the rotor spindle is in the form of a relatively thin piece of rod or steel wire and in which the spindle can be secured in the rotor lamination package without any risk of deforming the linearity of the spindle.

Figure 1:
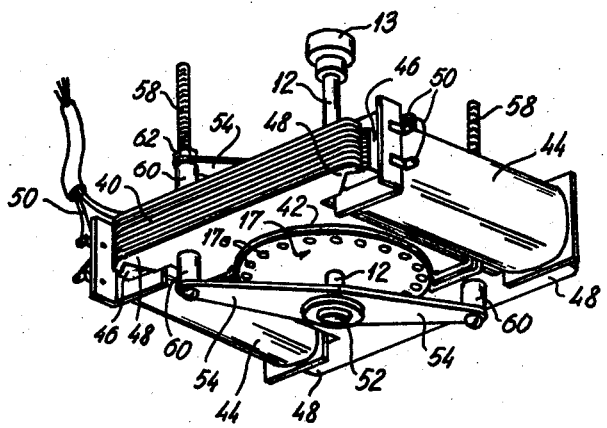
Figure 2:
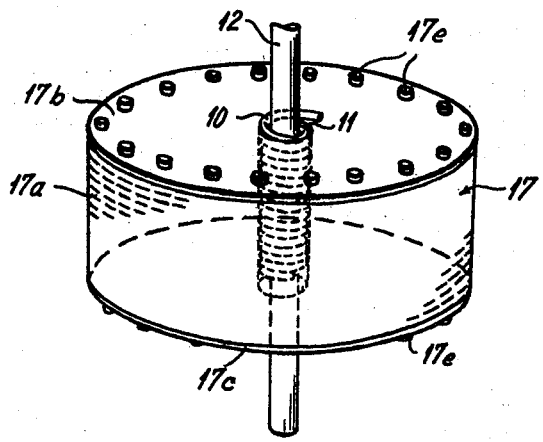

Still further objects of the invention will appear from the following description in connection with the drawings, in which:

FIGURE 1 is a perspective view of an electric motor having a rotor assembly according to this invention, the entire motor by way of example being shown as a small asynchronous motor for use in three-speed phonographs, FIGURE 2 is an enlarged perspective view of the rotor and a part of the motor shaft, seen from above, FIGURE 3 is a sectional view through the rotor shown in FIGURE 2, FIGURE 4 is a perspective, schematic view, partly in section, of a tool arrangement to be used for securing a helical spring on a motor shaft in a predetermined position thereon, and FIGURE 5 is a schematic, perspective view of a grinding arrangement for use in connection with the final surface grinding of the motor rotor.

In broad terms by invention provides an electrical motor having a part of its rotor shaft 12 surrounded by a tightly wound helical spring 10 which on the outside thereof is bonded to the rotor lamination 17.

Seen from another aspect, my invention provides an electrical motor in which the helical spring 10 is clamped over part of the rotor shaft 12 by its own tension and extends through the rotor lamination 17 to which it is bonded.

In more specific terms the rotor spindle 12 is along a part of its length surrounded by the helical spring 10 which is so designed that it, when untensioned, has a smaller interior diameter than the exterior diameter of the shaft 12 so that the spring 10 is allowed to clamp itself on the shaft surface by its own tension, the shaft being connected to the rotor lamination by bonding the spring thereto.

Seen from still another aspect my invention provides an electrical motor having a rotor structure including a spindle 12 having a cylindrical surface portion of reduced diameter for being received in the rotor bearings and an intermediate portion of increased diameter in the form of a helical spring 10 clamped on the spindle surface and bonded to the rotor lamination.

The motor illustrated in FIGURE 1 has a laminated stator body 40 provided with a centrally disposed cylindrical hole 42 for receiving the rotor 17. The motor further has two energizing electrical coils 44 each having a laminated core 46. Each coil assembly 44, 46 is positioned in a magnetic circuit with the armature 40 by engaging the core ends against sidewardly projecting portions 48 of the stator lamination 40 so as to hold the cores 46 firmly clamped therebetween.

Electrical wires 50 serve to energize the coils 44.

The rotor 17 is suspended in the stator construction described above by means of bearings 52 for the motor shaft 12. Only the lowermost bearing 52 which is an end bearing is seen in FIGURE 1. The bearings 52 are mounted on transverse carrier plates 54 secured to the stator 40 by means of screws 58, distance pieces 60 and nuts 62. The screws 58 are extended thereby in the upward direction for securing purposes.

The motor shaft 12 is fitted with a driving wheel 13 having driving sections with different diameters so as to constitute the driven part of some gear mechanism, not shown, for allowing the apparatus driven by the motor, for example a record player, to be driven at different predetermined speeds.

The motor shaft 12 extends through a central hole 11 in the laminated rotor body 17 and a helical spring 10 is interposed longitudinally between the shaft 12 and the wall of the bore 11, as shown in FIGURES 2 and 3.

The helical spring 10, when untensioned, has a smaller interior diameter than the exterior diameter of the motor shaft 12 so that it is clamped onto the shaft by its own tension. It extends through the rotor lamination package 17 and is bonded thereto by a layer of soldering material 16.

The connection between the spindle portion constituted by the spring 10 and the rotor lamination package 17 may be in the form of soldering or any other convenient bonding.

In the case of bonding any suitable synthetic bonding material may be used. As an example a bonding material manufactured by Ciba in Switzerland and known under the trade name Araldite can be mentioned. This is a synthetic bonding material which is supposed to be used together with a hardening agent.

The rotor lamination comprises a central lamination 17a of iron on each side of which there is provided a pair of discs 17b and 17c of a suitable alloy, for example copper, between which extend copper rods 17e which, after having been placed in position, are riveted at their ends and soldered to the surface of the copper discs 17a and 17b. The soldering material is allowed to float so as to also extend into the space between the spring 10 and the interior hole of the rotor lamination so as to at least give a firm soldering between the spring and the copper discs 17b and 17c. As material for the spring a suitable alloy to which a soldering material will bond safely is preferably selected such as for example a bronze alloy.

The helical spring 10 is preferably so orientated that it will tend to tighten itself around the motor shaft during operation of the motor.

It will be appreciated that the motor structure described hereinabove enables simplification and saving of costs by the connection of the shaft 12 and the rotor lamination 17. The structure eliminates the risk that the surface of the shaft can be damaged by putting the shaft into the hole of the rotor lamination and the structure also eliminates the risk that the shaft can be destroyed and made non-linear.

The invention thereby enables the use of finely polished spindles which contributes to reduced bearing noise which is especially important in sound reproducing equipment such as phonographs, tape recorders or the like.

Seen from another aspect the invention can be considered as comprising a motor spindle structure of the stepped type having end portions of reduced diameter for fitting in the motor bearings and an intermediate portion of increased diameter for being secured into the rotor lamination, and the invention provides the advantage that the intermediate portion of increased diameter is in the form of a helical spring.

This has the advantage that the shaft itself can be finished from a straight piece of rod or steel wire with a view of providing a complete linearity of the shaft and the finely polished surface, the helical spring serving the purpose only of securing the shaft in the rotor lamination.

The invention further provides a method for securing the rotor of an electric motor onto the shaft which comprises the steps of winding a helical spring to have, when untensioned, an interior diameter less than the exterior diameter of the motor shaft when placing it in a position to unwind it slightly to increase its interior diameter sufficiently to allow the shaft to be put in through the spring, introducing the shaft into the spring in the desired axial relationship thereto, untensioning the spring to allow it to clamp onto the motor shaft, introducing the shaft and spring assembly with the spring in the interior of the motor rotor lamination package and soldering the spring thereto.

A suitable outfit for connecting the spring onto the motor shaft is shown in FIGURE 4 and comprises a stationary member 76 having a bore or hole 18 for receiving one end of the motor shaft 12 and an abutment such as a pin 20 laterally disposed relatively to the bore 18. The outfit further comprises a holder 22 for the spring 10, for example in the form of a rod or the like having a bore extending from one end and provided with a portion 27 of a diameter slightly larger than the spring and of a length corresponding to the desired length of the spring. At the interior end, this bore has an abutment 27a. The bore further has an extension 26 for receiving the shaft 12.

When using this outfit the spring which is wound by means of the extending end 10a thereof is put into the bore 27, until its interior end abuts against the end of this bore. The shaft 12 is put in the bore 18, whereafter the holder 22 is positioned with the bore in axial relationship to the shaft and turned counterclockwise so as to abut the spring end 10a against the pin 20. This will cause the interior end of the spring to be engaged by the abutment 27a whereby the counterclockwise turning of the holder by the abutment 27a between the spring end 10a and the pin 20 will cause the spring to be tensioned to be unwound sufficiently to allow the spring 10 to be pushed over the shaft 12 which will thereby move through the bore 26 until it abuts against the end thereof. The dimensions, i.e. the axial extension of the bore 18 in the member 76 and the bore 26 in the holder 22 are so adapted that when the shaft 12 abuts against the end of the bore 26 the spring 10 is correctly positioned relatively to the shaft so that when untensioning the spring by turning the holder 22 clockwise again, the spring will be clamped in the correct position on the shaft.

A substantial part of the spring extension 10a is cut away thereafter, leaving a small extension 10b only, which will form an abutment for the rotor lamination package to which the structure is thereafter soldered as described hereinbefore.

It will be appreciated that the soldering preferably takes place in connection with the same soldering operation which serves to connect the copper rods 17e to the exterior layers 17b and 17c of the rotor lamination. The soldering process may be effectuated in a hot oil bath.

It will be appreciated that the connection between the rotor shaft and the lamination package provides for a gentle handling of the rotor without the latter being subject to mechanical stresses which might cause the rotor shaft to be bent.

My invention, therefore, though not exclusively, is of considerable advantage as it is believed to be a contribution to use of thin motor shafts such as desired in phonograph motors.

The invention further provides a method for finishing the motor rotor by grinding.

According to this method which may be applied to motor rotors which are connected to the shaft as described hereinbefore, the motor rotor is floatingly suspended resting on a bearing arrangement supporting the rotor on the shaft and is ground on its exterior surface against resilient counter pressure means.

A grinding arrangement is schematically shown in FIGURE 5 and includes a pair of V-shaped members 30a and 30b, the one side of each of which is relatively flat, while the other is relatively steep. The motor rotor is freely suspended with the shaft resting in the V-shaped notch. A grinding wheel 32 is mounted to one side of rotor 17 for reciprocable movement and a counter pressure roller 37 having a suitable friction surface and for example being of a convenient rubber composition is resiliently mounted to other side thereof by means of a spring (not shown) engaging the rotor. During the grinding operation the grinding wheel 32 is moved in the direction towards the rotor which by the resilient counter pressure from the roller 37 is kept floating in the correct position with the shaft resting in the bottom of the notches of the members 30a and 30b.

The movement of the grinding wheel 32 is interrupted by and adjustable, stationary abutment the position of which will determine the rotor diameter.

I have found that this grinding procedure causes a gentle handling of the rotor, giving a roundness of 0.0004″. Further this grinding method is easy to carry out in practice and enables a rational mass production of the rotor which does not require any further finish after the grinding.

Though the invention in the foregoing has been described in great detail it will be appreciated that the embodiment illustrated is to be considered as an example only and that modifications of the motor structure itself in various respects will be possible within the scope of the invention.

I claim:
1. An electrical motor structure, comprising a rotor including a cylindrical shaft, a helical spring which, when untensioned, has a smaller interior diameter than the exterior diameter of said shaft, the spring being mounted over said shaft to clamp itself onto the motor shaft surface over substantially the entire length of the spring by its own tension along a part of the length of the shaft, and said shaft being connected to the rotor by bonding the spring thereto by means of a synthetic bonding material.

2. An electrical motor structure, comprising a rotor including a cylindrical shaft, a helical spring which, when untensioned, has a smaller interior diameter than the exterior diameter of said shaft, the spring being mounted over said shaft to clamp itself to the motor shaft substantially over substantially the entire length of the spring by its own tension along a part of the length of the shaft, the shaft being connected to the rotor lamination by soldering.

3. An electrical motor structure comprising: a rotor having a substantially cylindrical rotor lamination with a central cylindrical bore extending substantially coaxially therethrough, said bore having a predetermined interior diameter, a shaft structure including an elongated cylindrical shaft having a predetermined exterior diameter and a helical spring which when untensioned has a smaller interior diameter than the exterior diameter of said shaft and being clamped onto said motor shaft surface by its own tension along a part of the length of said shaft to effectively provide along said part of the length of said shaft a portion formed by said spring having an exterior diameter which is slightly less than the interior diameter of said axial bore of said rotor lamination, said shaft structure being positioned in said rotor lamination with said helical spring within said lamination bore, and bonding means effectively bonding said rotor lamination to said helical spring.

4. An electrical motor structure comprising: a stator structure, bearing means on said stator structure, a rotor having a substantially cylindrical rotor lamination with a central cylindrical bore extending coaxially therethrough, said bore having a predetermined interior diameter, a shaft structure including an elongated cylindrical shaft, which is provided with reduced diameter portions received in said bearing means and an intermediate shaft portion having a predetermined increased exterior diameter, said intermediate shaft portion being effectively formed by a helical spring which when untensioned has a smaller interior diameter than the exterior diameter of said intermediate shaft portion and being clamped onto a part of said motor shaft surface over the entire length of the spring by its own tension to effectively provide along said intermediate shaft portion an exterior diameter which is slightly less than the interior diameter of said axial bore, said shaft structure being positioned in said rotor laminations with said helical spring in said lamination bore, and bonding means effectively bonding both end faces of said rotor lamination to said helical spring.

5. A method of constructing a rotor structure for an electrical motor by fastening a rotor lamination package onto an elongated cylindrical shaft, comprising the steps of subjecting said cylindrical shaft to surface treatment along its entire length to provide the desired uniform smooth surface with a predetermined exterior diameter, providing said rotor lamination package with an interior axial bore of an interior diameter which is larger than the exterior diameter of said shaft to provide a predetermined radial space between said exterior shaft surface and said interior bore surface with said shaft positioned concentrically in said bore, making a helical spring of material having a dimension slightly less than said radial space and with an initial interior diameter less than the exterior diameter of said shaft, tensioning said spring to effectively provide a second interior diameter larger than the exterior diameter of said shaft, introducing said shaft into said helical spring to assume a predetermined mutual position relatively thereto, releasing said spring to be tensioned onto said shaft along a part of its length so as to form with said shaft a shaft structure, introducing said shaft structure into said lamination package bore, and bonding said lamination onto said spring.

References Cited in the file of this patent

UNITED STATES PATENTS

| 2,105,330 | Pagenkopf | Jan. 11, 1938 |
| 2,497,550 | Jeffries | Feb. 14, 1950 |

FOREIGN PATENTS

| 80,732 | Netherlands | Mar. 15, 1956 |

OTHER REFERENCES

Girardot: Abstract of application Serial Number 160,516, published Aug. 5, 1952, O.G., volume 661, pages 310–311, August 5, 1952.